(12) United States Patent
Don et al.

(10) Patent No.: US 7,828,994 B2
(45) Date of Patent: Nov. 9, 2010

(54) CONDUCTIVE PAINT COMPOSITIONS FOR FORMING CONDUCTIVE COATINGS ON SUBSTRATES

(75) Inventors: Kim Hyun Don, Gyeonggi-do (KR); Chung Hae Ryong, Sendai (JP); Song Mi Kyung, Gyeonggi-do (KR); Bae Chang Seok, Gyeonggi-do (KR); Joung Young Gak, Seoul (KR); Hyun Myung Eok, Greenville, SC (US)

(73) Assignees: Ortec, Inc., Easley, SC (US); Panaxem Co., Ltd. (KR)

( * ) Notice: Subject to any disclaimer, the term of this patent is extended or adjusted under 35 U.S.C. 154(b) by 1135 days.

(21) Appl. No.: 11/190,580

(22) Filed: Jul. 26, 2005

(65) Prior Publication Data
US 2006/0086927 A1 Apr. 27, 2006

(30) Foreign Application Priority Data
Oct. 26, 2004 (KR) .............................. 2004-85739
Dec. 28, 2004 (KR) ............................ 2004-113992

(51) Int. Cl.
*H01B 1/06* (2006.01)
*H01B 1/24* (2006.01)

(52) U.S. Cl. ................ 252/514; 252/503; 252/512; 524/284; 524/507; 524/591; 528/44; 528/45; 528/61; 528/65; 528/407

(58) Field of Classification Search ............. 252/11, 252/12, 13, 14, 500, 512, 520, 518, 511, 252/513, 503; 525/453; 428/423.1, 407; 427/212, 218, 458; 523/415; 528/65, 44, 528/45, 61, 407; 524/284, 591, 507
See application file for complete search history.

(56) References Cited

U.S. PATENT DOCUMENTS

| | | | | |
|---|---|---|---|---|
| 3,859,244 A * | 1/1975 | Van Der Aue | .................. | 528/61 |
| 4,016,122 A | 4/1977 | Matsuda et al. | | |
| 4,016,123 A | 4/1977 | Matsuda et al. | | |
| 4,079,028 A * | 3/1978 | Emmons et al. | .............. | 524/507 |
| 4,190,567 A | 2/1980 | Ohmura et al. | | |
| 4,238,378 A * | 12/1980 | Markusch et al. | ........... | 524/591 |
| 4,277,383 A | 7/1981 | Hayashi et al. | | |
| 4,490,282 A * | 12/1984 | Corboy et al. | ................ | 252/503 |
| 4,794,147 A | 12/1988 | Savino et al. | | |
| 4,914,148 A | 4/1990 | Hille et al. | | |
| 4,950,423 A * | 8/1990 | Sullivan | ...................... | 252/512 |
| 5,068,150 A * | 11/1991 | Nakamura et al. | ........... | 428/407 |
| 5,114,485 A | 5/1992 | Lynch et al. | | |
| 5,126,424 A * | 6/1992 | Brindopke et al. | ............. | 528/45 |
| 5,480,480 A | 1/1996 | Lynch et al. | | |
| 5,712,342 A * | 1/1998 | Kim et al. | ..................... | 524/591 |
| 5,747,582 A * | 5/1998 | Schutze et al. | ............... | 524/591 |
| 5,786,033 A | 7/1998 | Gast et al. | | |
| 5,855,820 A * | 1/1999 | Chan et al. | ................... | 252/511 |
| 5,879,754 A * | 3/1999 | Geist et al. | ................... | 427/458 |
| 6,187,384 B1 | 2/2001 | Wilke et al. | | |
| 6,221,954 B1 | 4/2001 | Bechara et al. | | |
| 6,265,468 B1 * | 7/2001 | Chambers et al. | ............ | 523/415 |
| 6,375,866 B1 * | 4/2002 | Paneccasio et al. | .......... | 252/511 |
| 6,645,613 B1 | 11/2003 | Ricca | | |
| 2003/0088045 A1* | 5/2003 | Haberle et al. | ................. | 528/44 |
| 2004/0002561 A1* | 1/2004 | Saeki et al. | .................. | 524/284 |
| 2004/0054117 A1* | 3/2004 | Wamprecht et al. | ............ | 528/65 |
| 2006/0217497 A1* | 9/2006 | Kitada et al. | ................. | 525/453 |

FOREIGN PATENT DOCUMENTS

| | | | |
|---|---|---|---|
| EP | 0495373 A2 * | | 1/1992 |
| JP | 57-098572 | * | 6/1982 |
| JP | 60-001270 | * | 1/1985 |
| JP | 62-032126 | * | 2/1987 |
| JP | 02-10225 | * | 4/1990 |
| JP | 04-025566 | * | 1/1992 |
| JP | 04-025565 | * | 1/1993 |
| JP | 05039340 A | | 2/1993 |
| JP | 05-234739 | * | 9/1993 |
| KR | 10-2003-0041645 A | * | 5/2003 |
| KR | 10-2003-0054602 | * | 7/2003 |
| KR | 10-2004-0055103 A | * | 6/2004 |

OTHER PUBLICATIONS

"Aqueous Emulsions, Dispersion and Solution of Polyurethane; Synthesis and Properties," Dieterich, vol. 9, 1981, pp. 281-340.*
Nace International, "Back to Basics—Adhesion Testing: ASTM D3359," http://www.nace.org/nace/content/education/inspectthis/tech_art/back.asp., Printed Jun. 2, 2005, 2 pages.
Noveon, "Carbopol® EZ-2 Polymer, Product Specifications," Aug. 13, 2002, 1 page.

* cited by examiner

*Primary Examiner*—Mark Kopec
*Assistant Examiner*—Khanh Tuan Nguyen
(74) *Attorney, Agent, or Firm*—Myers Bigel Sibley & Sajovec, PA

(57) ABSTRACT

A conductive paint composition includes a solvent, metal powder, a rheology control agent and a water-dispersible polyurethane resin therein. The water-dispersible polyurethane resin has at least one aromatic group and a repeat unit of ether therein.

5 Claims, No Drawings

CONDUCTIVE PAINT COMPOSITIONS FOR FORMING CONDUCTIVE COATINGS ON SUBSTRATES

REFERENCE TO PRIORITY APPLICATION

This application claims priority to Korean Application No. 2004-85739, filed Oct. 26, 2004 and Korean Application No. 2004-113992, filed Dec. 28, 2004, the disclosures of which are hereby incorporated herein by reference.

FIELD OF THE INVENTION

The present invention relates to conductive paint compositions and methods of using same.

BACKGROUND OF THE INVENTION

Electromagnetic waves generated by internal components of various electronic instruments such as mobile communication terminals, notebook computers, business machines and medical instruments allegedly may cause a variety of disorders such as headache, visual acuity reduction, leukemia, brain tumors, circulation system abnormalities and sterility. In addition, with the increased degree of manufacturing integration and trends towards miniaturization and weight reduction in electronic products, electromagnetic noise generated by product elements may cause product malfunction. To address these problems, regulations have been introduced to limit the electromagnetic (EM) emissions and radio interference caused by some electronic products, including computers, wireless phones, medical instruments and multimedia players. Accordingly, methods of shielding electromagnetic emissions generated by certain electronic products have come to play an important role in product design and industrial manufacturing processes.

Conventional shielding methods for blocking electromagnetic waves include plating, vacuum evaporation, spray-coating and similar methods. Electromagnetic wave shielding methods utilizing plating have been used extensively, but may suffer from relatively high production costs, complex production processes and environmental contamination. In addition, shielding of electromagnetic waves using vacuum evaporation can be relatively expensive and suffer from long term reliability problems. In contrast, electromagnetic wave shielding techniques employing spray-coating of metal powder may support relatively easy application methods and result in relatively little environmental contamination.

Methods of spray-coating typically include spraying a coating solution onto a substrate. The coating solution typically contains a mixture of an adhesive resin and conductive metal. To be useful in most manufacturing processes, the conductive coating should have excellent abrasion resistance to withstand scratching caused by back-end manufacturing steps. The conductive coating should also have good adhesion characteristics to prevent peeling of the conductive coating and contamination and failure of surrounding electronic components.

In a conventional spray-coating method, a metal powder, such as a flake-like silver powder, nickel powder or aluminum powder, may be used to provide electrical conductivity within an otherwise relatively highly resistive paint composition. Unfortunately, the metal powder within a paint composition may settle and form a sediment within the paint composition. The formation of a sediment may cause layer separation that is difficult to correct with conventional mixing techniques such as mechanical stirring. To inhibit sedimentation, the paint composition should have sufficiently high viscosity. An example of a conventional spray-coating composition is disclosed in U.S. Pat. No. 6,645,613 to Ricca. In particular, Ricca discloses a coating composition containing an aqueous polyurethane dispersion having an alkyl chain structure.

Some polyurethanes may be used as adhesive resins within spray coatings if they possess sufficient flexibility, rebound resilience and abrasion resistance and provide sufficiently strong adhesiveness. Conventional polyurethanes have frequently been prepared and used as oily preparations and may utilize organic solvents such as methyl ethyl ketone (MEK), dimethylformamide and toluene in order to impart sufficient viscosity to the preparation. Unfortunately, the use of organic solvents may contribute to environmental pollution and may cause health problems in persons exposed to the preparation. The use of organic solvents may also pose a substantial fire risk. To address these problems, water-dispersible polyurethane resins have been developed. Some of the water-dispersible polyurethane resins are manufactured using spontaneous emulsification methods and have a chemical structure that includes ionic groups on a polymer backbone. Methods for imparting ionic groups such as cationic ionomers to a main chain of a polyurethane are disclosed in U.S. Pat. Nos. 4,016, 123, 4,190,567 and 4,277,383, and in Japanese Patent Laid-Open Application No. Hei 5-320331. Additional methods for imparting ionic groups such as anionic ionomers to a main chain of a polyurethane are disclosed in U.S. Pat. Nos. 4,016, 122 and 4,914,148 and in Japanese Patent Laid-Open Application No. Hei 5-39340. U.S. Pat. No. 4,794,147 discloses a method of imparting a non-ionic compound to a main chain of a polyurethane.

Water-dispersible polyurethane resins may be broadly classified as polyether, polyester and acrylate-based dispersions, depending on the type of polyols utilized in polymerization. Among these, polyester-based polyols, which typically exhibit strong adhesiveness to various materials and excellent mechanical and physical properties, such as abrasion resistance, are widely used. A polyester-based polyol may be synthesized by reacting a polyfunctional acid with a polyhydric alcohol. Polyfunctional acids utilized in the synthesis of polyester-based polyols include aliphatic acids such as adipic acid, and aromatic acids such as benzoic acid, isophthalic acid, terephthalic acid, phthalic anhydride and anhydride.

SUMMARY OF THE INVENTION

Embodiments of the present invention include conductive paint compositions having a solvent, metal powder, a water-dispersible polyurethane resin and, optionally, a rheology control agent therein. The polyurethane resin includes at least one aromatic group and a repeat unit of ether therein. In some of these embodiments, the repeat unit of ether may be polyethylene oxide or polypropylene oxide. In additional embodiments of the invention, the metal powder may be a silver powder or a silver-coated copper powder. Moreover, to achieve enhanced conductivity within a resulting conductive coating, the metal powder can include a first metal powder having a first average particle size and a second metal powder having a second average particle size greater than the first average particle size. The weight percent ratio of the second metal powder to the first metal powder may be greater than 4:1.

Additional embodiments of the invention include methods of manufacturing a substrate having a conductive paint coating thereon. These methods include spraying a surface of the substrate with a conductive paint composition. This composition includes a solvent, metal powder and a water-dispersible polyurethane resin having at least one aromatic group and a repeat unit of ether therein. The conductive paint composition is then cured. This curing step includes drying the conductive paint composition on the surface at a temperature in a range from about 40° C. to about 70° C.

DETAILED DESCRIPTION OF PREFERRED EMBODIMENTS

The present invention now will be described more fully herein with reference to the accompanying drawings, in which preferred embodiments of the invention are shown. This invention may, however, be embodied in many different forms and should not be construed as being limited to the embodiments set forth herein; rather, these embodiments are provided so that this disclosure will be thorough and complete, and will fully convey the scope of the invention to those skilled in the art.

Conductive paint compositions according to embodiments of the present invention include a solvent, metal powder and a water-dispersible polyurethane resin having at least one aromatic group and a repeat unit of ether therein. These conductive paint compositions may also include a rheology control agent. In particular, in some of the embodiments, the conductive paint compositions may utilize a polyurethane resin having a chemical structure of Formula (1):

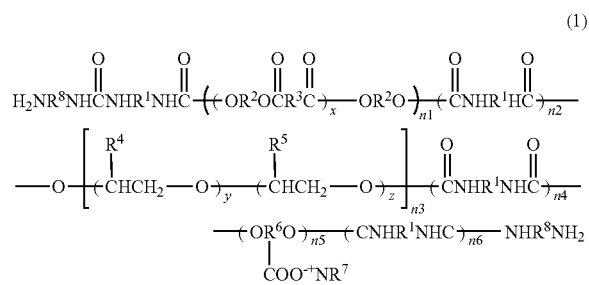

wherein: $R^1$ represents an aliphatic hydrocarbon having from 4 to 12 carbon atoms, a cyclic aliphatic hydrocarbon having from 6 to 15 carbon atoms or a mixture thereof; $R^2$ represents an aliphatic hydrocarbon having from 2 to 12 carbon atoms; $R^3$ represents an aliphatic hydrocarbon having from 2 to 20 carbon atoms or an aromatic hydrocarbon having from 6 to 20 carbon atoms; $R^4$ and $R^5$ independently represent a hydrogen atom or a methyl group; $R^6$ represents an aliphatic hydrocarbon having from 3 to 4 carbon atoms; $R^7$ represents a hydrogen atom or an aliphatic hydrocarbon having from 1 to 9 carbon atoms; $R^8$ represents an aliphatic hydrocarbon having from 1 to 10 carbon atoms, a cyclic aliphatic hydrocarbon having from 3 to 10 carbon atoms or a mixture thereof; wherein the ratio of $n1:(n2+n4+n6):n3:n4$ is (0.2 to 1.5):(1.0 to 3.0):(0.01 to 0.3):(0.1 to 1.0); wherein n5 is from 0.1 to 1.0; wherein x is from 1 to 20; wherein a sum of y and z is from 2 to 200; and wherein the polyurethane resin contains a repeating unit in which $R^3$ is an aromatic hydrocarbon and a repeating unit in which $R^3$ is an aliphatic hydrocarbon. According to further aspects of these embodiments, the conductive paint composition includes 0.2 to 60 wt % of the water-dispersible polyurethane resin, 10 to 60 wt % of the metal powder and 10 to 60 wt % of the solvent. The repeat units of Formula (1) may also be provided in different order than illustrated.

Additional embodiments of the present invention include forming a conductive coating on substrates by applying the above-described conductive paint composition to a surface of the substrate and then heat-treating the applied composition and substrate in a drying oven to thereby cure the conductive coating and establish a high degree of scratch resistance to the coating surfaces. Typical substrates that may satisfactorily receive the conductive paint composition of the present invention include but are not limited to polycarbonate substrates, polycarbonate alloy substrates, Acrylo-Butadiene-Styrene (ABS) substrates, Acrylo-Butadiene-Styrene/polycarbonate copolymer (ABS/PC) substrates and polyphenylene sulfite (PPS) resin substrates.

The heat-treatment steps include drying an applied conductive paint composition in a drying oven maintained at a temperature in a range from about 40° C. to about 70° C. Drying the conductive paint composition at a temperature of less than about 40° C. may lead to poor adhesiveness, reduced conductivity of the resulting conductive coating and increased drying time. In contrast, drying the conductive paint composition at a temperature of greater than 70° C. may result in morphological changes in a coated substrate and deteriorate the performance of the conductive coating. Conductive films coated on the plastic housings of mobile phones, notebook computers and similar electronic components have been shown to provide excellent adhesion and scratch resistance characteristics. These characteristics are believed to result from using a water-dispersible polyurethane resin having both aliphatic and aromatic functional groups therein. The repeat unit of ether is also believed to support higher viscosity and lower resistance and inhibit "acetone shock" (e.g., particle aggregation).

Although not wishing to be bound by any theory, it is believed that combined application of aliphatic polyfunctional acids and aromatic polyfunctional acids in synthesizing the polyol of the resin may provide a polyester-based polyol having both flexibility imparted by the aliphatic acid and strong cohesive forces and abrasion resistance imparted by the aromatic acid. The ratio of the aliphatic polyfunctional acid and aromatic polyfunctional acid may be within a wide range of 99:1 to 1:99.

The content of the water-dispersible polyurethane resin in the conductive paint composition is preferably in a range between 0.2 wt % and 60 wt %, and more preferably in a range between 0.5 wt % and 40 wt %. When the content of the water-dispersible polyurethane resin is less than 0.2 wt %, the adhesion characteristics and abrasion resistance of the conductive coating after heat treatment may be relatively poor. However, when the content of the water-dispersible polyurethane resin exceeds 60 wt %, the sheet resistance of the conductive coating may be excessive. One example of a water-dispersible polyurethane resin that may be used in conductive paint compositions of the present invention is Reactisol PS-3, which is available from Ortec, Inc. of Easley, S.C.

A suitable metal powder for use in the conductive paint composition may be selected from a group consisting of silver powder and silver-coated copper powder. If silver powder is used, then a flake-like powder of silver having an average particle size of 1 um to 10 um is acceptable. If a silver-coated copper powder is used, then a flake-like copper powder having an average particle size of 5 um to 50 um is preferred. The amount of the metal powder used in the conductive composition is preferably from 10 wt % to 60 wt %. If the amount of the metal powder is less than 10 wt %, the conductivity of the resulting conductive coating may be unacceptably low. Alternatively, if the amount of the metal powder exceeds 60 wt %, the expense of the resulting conductive coating may be unacceptably high. Acceptable silver powders include the following products available from the Ferro Corporation of Cleveland, OH: SF-70A, SF-9ED, SF-7A, SF-7E, SF-9 and SF-15-2, and product SF-162 available from HRP Metals Inc. of Sewickley, Pa. Acceptable silver-coated copper powders include AgCu-200, AgCu-250, AgCu-300 and AgCu400, which are available from the Ferro Corporation.

In order to improve the conductivity of the conductive coatings described herein, a mixture of a first silver powder having an average particle size of 1 um to 5 um (hereinafter referred to as "powder A") and a second silver powder having an average particle size of 4 um to 10 um (hereinafter referred to as "powder B") is preferably used in order to increase overall conductivity. When a mixture of powder A and powder B is used, the weight percent mixing ratio of powder A to powder B is preferably in a range of 99.9:0.1 to 80:20. The use of a powder mixture having a weight percent of powder A below 80% may not achieve sufficient synergistic effects as a result of mixing with powder B.

Examples of solvents that can be used in the aforementioned conductive paint compositions include methyl alcohol, ethyl alcohol, isopropyl alcohol, ethyl acetate, methylpyrrolidone, acetone, methyl cellusolve, ethyl cellusolve and butyl cellusolve. The concentrations of these solvents may be in a range from 10 wt % to 60 wt %. These solvents, which are preferred over relatively strongly corrosive solvents such as methyl ethyl ketone (MEK), do not significantly degrade plastic substrates and are relatively environmentally friendly. Moreover, the use of relatively low boiling point solvents may reduce production costs by supporting relatively low temperature heat treatment conditions during curing.

Conductive paint compositions according to further embodiments of the present invention may include a rheology control agent, which is optional. A preferred rheology control agent is an acrylic polymer type that is relatively easily dissolved in alcohol-based solvents, does not significantly influence the conductivity of the resulting cured conductive coatings, inhibits metal precipitation, and improves spraying workability. An example of a preferred rheology control agent is Carbopol EZ-2, which is available from Noveon, Inc, of Cleveland, Ohio. In the event a rheology control agent is used in a conductive paint composition, then it is preferably used in an amount in a range from 0.1 wt % to 20 wt %. The use of a rheology control agent in an amount less than 0.1 wt % may result in relatively low viscosity of the conductive paint composition, which can lead to increased metal precipitation. However, the use of a rheology control agent in an amount greater than 20 wt % may cause a relatively strong interaction between the resin and the rheology control agent and thereby lead to relatively poor storage characteristics.

Embodiments of the present invention will now be described in greater detail with reference to the following examples. These examples are only provided to illustrate some embodiments the present invention and should not be construed as limiting the scope of the invention to these exemplary embodiments. These examples include a preliminary paste preparation step. In this preparation step, a paste of a rheology control agent (Carbopol EZ-2) was prepared by placing 950 grams of ethanol in a vessel and mixing 20 grams of Carbopol EZ-2 into the vessel while stirring the mixture at 700 rpm using a high-speed stirrer. After stirring at 800 rpm for 30 min, the resulting mixture was neutralized with 30 grams of Ethomeen C/25, which is available from Akzo Nobel Surface Chemistry, LLC. The neutralized mixture was then stirred at 1000 rpm for 1 hour.

EXAMPLE NO. 1

94 grams of a water-dispersible polyurethane resin of Formula 1 (e.g., Reactisol PS-3) was added to a vessel using a Dispermat D-51580 Laboratory Dispenser, manufactured by VMA-Getzmann GMBH of Germany. Then, 186 grams of a commercially available silver powder (SF-70A) was added to the vessel and the mixture was stirred at 2000 rpm for 30 minutes. Next, 141 grams of ethanol was added to the vessel and mixed at 500 rpm for 10 minutes. This was followed by the addition of 57 grams of the Carbopol paste while stirring at 1000 rpm for 30 minutes to adjust viscosity. This prepared mixture was then diluted with 100 vol % of ethanol. The combination was then sprayed onto a polycarbonate sheet (15 cm×6 cm×2 mm) to achieve a coating thickness of 12.5 um. The coated sheet was then dried in a drying oven at 60° C. for 15 minutes. The physical properties of the dried conductive coating were then evaluated. These physical properties are illustrated below by TABLE 1.

EXAMPLE NO. 2

70 grams of Reactisol PS-3 was added to a vessel using a Dispermat D-51580 dispenser and mixed with 116 grams of a silver-coated copper powder (AgCu-200). This mixture was stirred at 1000 rpm for 30 minutes. Then, 279 grams of ethanol was added to the mixture and stirred at 500 rpm for 10 minutes. This step was followed by the addition of 12 grams of the Carbopol paste and stirring at 1000 rpm for 30 minutes while adjusting viscosity. The combination was then sprayed onto a polycarbonate sheet (15 cm×6 cm×2 mm) to achieve a coating thickness of 12.5 um. The coated sheet was then dried in a drying oven at 60° C. for 15 minutes. The physical properties of the dried conductive coating were then evaluated. These physical properties are illustrated below by TABLE 1.

EXAMPLE NO. 3

94 grams of Reactisol PS-3 was added to a vessel using a Dispermat D-51580 dispenser and mixed with 186 grams of a silver powder mixture. This silver powder mixture included silver powder having an average particle size of 2 um (SF-70A) and silver powder having an average particle size of 5 um (SF-10E). The combined mixture was stirred at 2000 rpm for 30 minutes. Then, 141 grams of ethanol was added to the vessel and mixed at 500 rpm for 10 minutes. This was followed by the addition of 57 grams of the Carbopol paste. This mixture was stirred at 1000 rpm for 30 minutes while adjusting viscosity. The combination was then sprayed onto a polycarbonate sheet (15 cm×6 cm×2 mm) to achieve a coating thickness of 12.5 um. The coated sheet was then dried in a drying oven at 60° C. for 15 minutes. The physical properties of the dried conductive coating were then evaluated. These physical properties are illustrated below by TABLE 1.

COMPARATIVE EXAMPLE NO. 1

94 grams of a water-dispersible polyurethane resin having only an alkyl chain structure (Spensol L512, available from Reichhold) was added to a vessel using a Dispermat D-51580 dispenser and mixed with 186 grams of silver powder (SF-70A). The mixture was stirred at 2000 rpm for 30 minutes. 141 grams of ethanol was added to the vessel and mixed at 500 rpm for 10 minutes. This was followed by the addition of 57 grams of the Carbopol paste. The combined mixture was then stirred at 1000 rpm for 30 minutes while adjusting viscosity. The combination was then sprayed onto a polycarbonate sheet (15 cm×6 cm×2 mm) to achieve a coating thickness of 12.5 um. The coated sheet was then dried in a drying oven at 60° C. for 15 minutes. The physical properties of the dried conductive coating were then evaluated. These physical properties are illustrated below by TABLE 1.

COMPARATIVE EXAMPLE NO. 2

70 grams of a water-dispersible polyurethane resin having only an alkyl chain structure (Spensol L512) was added to a vessel using a Dispermat D-51580 dispenser and mixed with 116 grams of a silver-coated copper powder (AgCu-200). The mixture was stirred at 1000 rpm for 30 minutes. 279 grams of ethanol was added to the vessel and mixed at 500 rpm for 10 minutes. This was followed by the addition of 12 grams of the Carbopol paste and stirring at 1000 rpm for 30 minutes. The composition was then sprayed onto a polycarbonate sheet (15 cm×6 cm×2 mm) to achieve a coating thickness of 12.5 um. The coated sheet was then dried in a drying oven at 60° C. for 15 minutes. The physical properties of the dried conductive coating were then evaluated. These physical properties are illustrated below by TABLE 1.

COMPARATIVE EXAMPLE NO. 3

This example used the same resulting composition as in Example 3, however, drying of the spray-coated sheet was performed in a drying oven at 30° C. for 15 minutes. The physical properties of the dried conductive coating were then evaluated. These physical properties are illustrated below by TABLE 1.

conductive paint coatings of Examples 1-3 exhibited relatively high paint viscosity and excellent adhesiveness and abrasion resistance.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A conductive paint composition, comprising a solvent, metal powders and a water-dispersible polyurethane resin having the following formula:

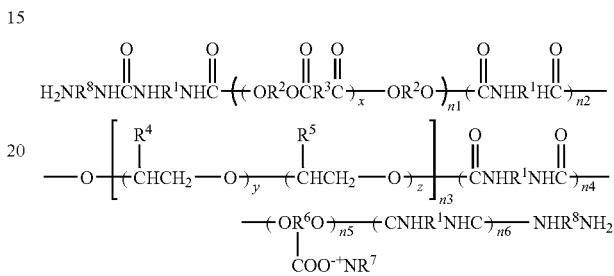

wherein: $R^1$ represents an aliphatic hydrocarbon having from 4 to 12 carbon atoms, a cyclic aliphatic hydrocarbon having from 6 to 15 carbon atoms or a mixture thereof; $R^2$ represents an aliphatic hydrocarbon having from 2 to 12 carbon atoms; $R^3$ represents an aliphatic hydrocarbon having from 2 to 20 carbon atoms or an aromatic hydrocarbon having from 6 to 20 carbon atoms; $R^4$ and $R^5$ independently represent a hydrogen atom or a methyl group; $R^6$ represents an aliphatic hydrocarbon having from 3 to 4 carbon atoms; $R^7$ represents a hydro-

TABLE 1

|  | RESISTANCE (ohms/square) | ADHESIVENESS | ABRASION RESISTANCE (rpm) | VISCOSITY (cPs) |
|---|---|---|---|---|
| EXAMPLE 1 | 0.010 | 5B | 419 | 39,500 |
| EXAMPLE 2 | 0.050 | 5B | 530 | 4,560 |
| EXAMPLE 3 | 0.015 | 5B | 421 | 37,200 |
| COMP. EX. 1 | 0.015 | 4B | 182 | 9,300 |
| COMP. EX. 2 | 0.050 | 1B | 197 | 1,150 |
| COMP. EX. 3 | 0.220 | 1B | 118 | 37,200 |

The physical properties illustrated by TABLE 1 were evaluated using conventional techniques. In particular, resistance measurements were performed using a multimeter and adhesiveness measurements were performed in accordance with ASTM D3359. Abrasion resistance was measured by evaluating when a hole is made in a conductive coating using an abrasion tester (RCA Abrader, Norman Tool, Inc., USA) and a tape having a ¼ inch width. Viscosity was measured on a Brookfield Model LVT viscometer, spindle No. 3, 30 rpm, which is a viscometer suitable for low viscosity measurements. When the viscosity is greater than 10,000 cPs, it is measured on the viscometer for high viscosity measurements (RVT), spindle No. 7, at 20 rpm.

As illustrated by TABLE 1, the conventional conductive paint coatings of Comparative Examples 1-2 (prepared using the water-dispersible polyurethane resin having only an alkyl chain structure) exhibited low paint viscosity and relatively poor adhesiveness and abrasion resistance. In contrast, the gen atom or an aliphatic hydrocarbon having from 1 to 9 carbon atoms; $R^8$ represents an aliphatic hydrocarbon having from 1 to 10 carbon atoms, a cyclic aliphatic hydrocarbon having from 3 to 10 carbon atoms or a mixture thereof; wherein the ratio of $n1:(n2+n4+n6):n3:n4$ is (0.2 to 1.5):(1.0 to 3.0):(0.01 to 0.3):(0.1 to 1.0); wherein $n5$ is from 0.1 to 1.0; wherein $x$ is from 1 to 20; wherein a sum of $y$ and $z$ is from 2 to 200; and wherein the polyurethane resin contains a repeating unit in which $R^3$ is an aromatic hydrocarbon and a repeating unit in which $R^3$ is an aliphatic hydrocarbon;

wherein the metal powders comprises a first metal powder having an average particle size in a range of 1 to 5 microns and a second metal powder having a particle size in a range of 4 to 10 microns, wherein the average particle size of the second metal powder is greater than the average particle size of the first metal powder, and wherein the weight percent ratio of the second metal powder to the first metal powder is greater than 4:1.

2. The conductive paint composition of claim 1, further comprising a rheology control agent.

3. The conductive paint composition of claim 1, wherein the metal powder is a silver-coated copper powder.

4. A method of manufacturing a substrate having a conductive paint coating thereon, comprising the steps of:
   spraying a surface of the substrate with the conductive paint composition of claim 1; and
   spraying a surface of the substrate with the conductive paint composition of claim 1 comprising a solvent, metal powder and a water-dispersible polyurethane resin having at least one aromatic group and a repeat unit of ether therein; and
   drying the conductive paint composition on the surface at a temperature in a range from about 40° C. to about 70° C.

5. The method of claim 4, wherein the conductive paint composition further comprises a rheology control agent.

* * * * *

UNITED STATES PATENT AND TRADEMARK OFFICE
CERTIFICATE OF CORRECTION

| | | |
|---|---|---|
| PATENT NO. | : 7,828,994 B2 | Page 1 of 1 |
| APPLICATION NO. | : 11/190580 | |
| DATED | : November 9, 2010 | |
| INVENTOR(S) | : Don et al. | |

It is certified that error appears in the above-identified patent and that said Letters Patent is hereby corrected as shown below:

In the Claims:
Column 8, Claim 1, Line 60: Please correct "comprises" to read -- comprise --

Signed and Sealed this
Fourteenth Day of June, 2011

David J. Kappos
*Director of the United States Patent and Trademark Office*